(12) United States Patent
Nagashima et al.

(10) Patent No.: US 10,739,810 B2
(45) Date of Patent: Aug. 11, 2020

(54) ACCELERATOR PEDAL DEVICE

(71) Applicant: MIKUNI CORPORATION, Tokyo (JP)

(72) Inventors: Jun Nagashima, Kanagawa (JP); Satoshi Miyazaki, Kanagawa (JP); Kazunari Nakashima, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 16/474,553

(22) PCT Filed: Nov. 30, 2017

(86) PCT No.: PCT/JP2017/043205
§ 371 (c)(1),
(2) Date: Jun. 28, 2019

(87) PCT Pub. No.: WO2018/123437
PCT Pub. Date: Jul. 5, 2018

(65) Prior Publication Data
US 2019/0381882 A1 Dec. 19, 2019

(30) Foreign Application Priority Data
Dec. 28, 2016 (JP) ................. 2016-255175

(51) Int. Cl.
*G05G 1/30* (2008.04)
*G05G 5/03* (2008.04)
(Continued)

(52) U.S. Cl.
CPC ............... *G05G 1/44* (2013.01); *G05G 5/03* (2013.01); *G05G 5/05* (2013.01)

(58) Field of Classification Search
CPC ............... B60K 26/02; B60K 26/021; B60K 2026/026; B60K 2370/131; G05G 5/03;
(Continued)

(56) References Cited

U.S. PATENT DOCUMENTS 6,658,963 B2 * 12/2003 Yaddehige ............... G05G 1/30
74/473.16
6,860,170 B2 * 3/2005 DeForest ................. G05G 1/30
74/512
(Continued)

FOREIGN PATENT DOCUMENTS

JP 2003072413 3/2003
JP 2003237405 8/2003
(Continued)

OTHER PUBLICATIONS

Machine translation of JP 2003-237405 A obtained on Oct. 17, 2019.*
(Continued)

*Primary Examiner* — Adam D Rogers
(74) *Attorney, Agent, or Firm* — JCIPRNET

(57) ABSTRACT

This accelerator pedal device is provided with a pedal arm having an accelerator pedal, a housing that swingably supports the pedal arm, a slider that slides over the inner wall of the housing and that is pressed by the depressing of the accelerator pedal, a hysteresis-causing mechanism that includes a biasing spring for exerting biasing force through the slider so as to push back the pedal arm with and that causes hysteresis in the depressing force, and a return spring that exerts biasing force directly on the pedal arm in order to return the pedal arm to a rest position, the biasing spring and the return spring being disposed in the same area inside the housing.

18 Claims, 15 Drawing Sheets

(51) Int. Cl.
*G05G 1/44* (2008.04)
*G05G 5/05* (2006.01)

(58) Field of Classification Search
CPC .. G05G 5/05; G05G 1/30; G05G 1/44; G05G 1/445
See application file for complete search history.

(56) References Cited

U.S. PATENT DOCUMENTS

| | | | | |
|---|---|---|---|---|
| 8,161,842 B2* | 4/2012 | Kim | ................... | B60K 26/021 |
| | | | | 74/513 |
| 8,806,977 B2* | 8/2014 | Stewart | ............... | B60K 26/021 |
| | | | | 74/512 |
| 9,075,427 B2* | 7/2015 | Muraji | ................. | B60K 26/021 |
| 9,079,492 B2* | 7/2015 | Osawa | ................... | B60K 26/02 |
| 9,671,815 B2* | 6/2017 | Fuller | ..................... | G05G 1/44 |
| 9,811,108 B2* | 11/2017 | Kumamoto | .............. | G01B 7/30 |
| 10,401,896 B1* | 9/2019 | Kim | ........................ | G05G 1/44 |
| 2006/0230875 A1* | 10/2006 | Ouyang | .................. | G05G 1/30 |
| | | | | 74/560 |
| 2010/0300240 A1* | 12/2010 | Kim | ........................ | G05G 1/30 |
| | | | | 74/513 |
| 2013/0091977 A1* | 4/2013 | Fukushima | .......... | B60K 26/021 |
| | | | | 74/513 |
| 2015/0192076 A1* | 7/2015 | Jordan | .................. | F02D 11/107 |
| | | | | 74/514 |

FOREIGN PATENT DOCUMENTS

| | | |
|---|---|---|
| JP | 2007137152 | 6/2007 |
| JP | 2007276707 | 10/2007 |
| JP | 2008-184108 | 8/2008 |
| JP | 2009040161 | 2/2009 |

OTHER PUBLICATIONS

Machine translation of JP 2007-276707 A obtained on Oct. 17, 2019.*

"International Search Report (Form PCT/ISA/210) of PCT/JP2017/043205," dated Feb. 13, 2018, with English translation thereof, pp. 1-4.

* cited by examiner

ACCELERATOR PEDAL DEVICE

CROSS-REFERENCE TO RELATED APPLICATION

This application is a 371 application of the international PCT application serial no. PCT/JP2017/043205, filed on Nov. 30, 2017, which claims the priority benefit of Japan application no. 2016-255175, filed on Dec. 28, 2016. The entirety of each of the above-mentioned patent applications is hereby incorporated by reference herein and made a part of this specification.

BACKGROUND

Technical Field

The present invention relates to an accelerator pedal device applied to a vehicle or the like that adopts an electronically controlled throttle system, and more particularly to an accelerator pedal device including a mechanism for generating hysteresis in a depressing force of the accelerator pedal.

Description of Related Art

In an engine mounted on a car or the like, an accelerator pedal device applied to an electronically controlled throttle system (also referred to as a throttle-by-wire system), which includes a pedal arm having an accelerator pedal, a housing that swingably supports the pedal arm, a first return spring that is disposed in the vicinity of a swinging support axis in order to return the pedal arm to a rest position, a hysteresis-causing mechanism that causes hysteresis in a depressing force of the accelerator pedal, etc. is known (see, for example, Patent Literature 1).

In this accelerator pedal device, the hysteresis-causing mechanism is configured by a first slider which separably abuts an upper end part of the pedal arm and slides on an inner wall surface of the housing, a second slider which slides on the inner wall surface of the housing and causes a wedge action in cooperation with the first slider, a second return spring which abuts the second slider and returns the pedal arm to the rest position via the first slider, etc.

Meanwhile, in the above accelerator pedal device, the first return spring is disposed in the vicinity of the swinging support axis, and the second return spring is disposed in an area in which the first slider and the second slider are disposed. That is, since the first return spring and the second return spring are disposed in separate areas partitioned by a wall part of the housing, components cannot be disposed compactly. As a result, complication of the structure, and increases in size of the housing and the device are caused.

In addition, since the hysteresis-causing mechanism includes two sliders independent from each other, the number of components is large and the structure is complicated. Also, since the first slider and the second slider linearly reciprocate in the housing, increases in size of the housing and the device, or the like are caused.

Related Art

Patent Literature
 [Patent Literature 1] Japanese Patent Laid-open Publication No. 2008-184108

SUMMARY

Technical Problem

An object of the present invention is to provide an accelerator pedal device which can solve the above problems of conventional techniques while achieving miniaturization of an overall size of the device due to integration of components.

Solution to Problem

An accelerator pedal device of the present invention is configured by including: a pedal arm having an accelerator pedal; a housing which swingably supports the pedal arm between a rest position and a maximum depressing position about a predetermined axis; a hysteresis-causing mechanism which includes a slider that slides on an inner wall of the housing and is pressed by pushing of the accelerator pedal, and a biasing spring that exerts a biasing force through the slider so as to push back the pedal arm, and which causes hysteresis in the depressing force; and a return spring which exerts a biasing force directly on the pedal arm in order to return the pedal arm to the rest position, in which the biasing spring and the return spring are disposed in the same area inside the housing.

Here, the biasing spring and the return spring may be compression type coil springs, and may be coaxially disposed in a nested manner.

Also, the biasing spring and the return spring may be disposed such that each of center lines of the biasing spring and the return spring is straight while the pedal arm is at the rest position, and are convexly curved toward an axis side while the pedal arm is between the rest position and the maximum depressing position.

The hysteresis-causing mechanism may include a contact part which is configured on the pedal arm in order to apply a pressing force while separably contacting the slider, and the biasing spring may be disposed between the housing and the slider such that the biasing force for pressing the slider against the inner wall of the housing and the contact part increases in response to the depressing of the accelerator pedal.

Here, the slider may have a spring receiving part for receiving the biasing spring, and a punched area through which the return spring passes, and the pedal arm may have a spring receiving part for receiving the return spring in the vicinity of the contact part.

The slider may be configured to slide on the inner wall of the housing along a predetermined curvature around the axis.

The contact part of the pedal arm may be configured to contact the slider on a first straight line passing through the axis.

The slider may be configured to receive the biasing spring on a second straight line that forms a predetermined acute angle with the first straight line on a side closer to the contact part than the axis, and the pedal arm may be configured to receive the return spring on a third straight line that forms the predetermined acute angle with the first straight line on a side closer to the contact part than the axis.

The slider may include a first outer contour part which has an outer contour on a surface perpendicular to a sliding direction of the slider configured in a substantially rectangular shape, and a second outer contour part which has an outer contour on a surface parallel to the sliding direction configured in a substantially fan shape.

The slider may include a cylindrical restricting part which is fitted to an inside of the biasing spring in an inner area of the spring receiving part.

The pedal arm may include a cylindrical part centered on the axis, an upper arm extending upward from the cylindrical part, and a lower arm extending downward from the cylindrical part. The upper arm may have the contact part and a spring receiving part for receiving the return spring, and the cylindrical part may have a concave relief part for disposing the biasing spring in a non-contact manner.

Advantageous Effects of Invention

According to the accelerator pedal device having the above configuration, it is possible to solve the problems of conventional techniques and achieve miniaturization of the overall size of the device due to integration of the components.

DESCRIPTION OF THE EMBODIMENTS

Figure 1:
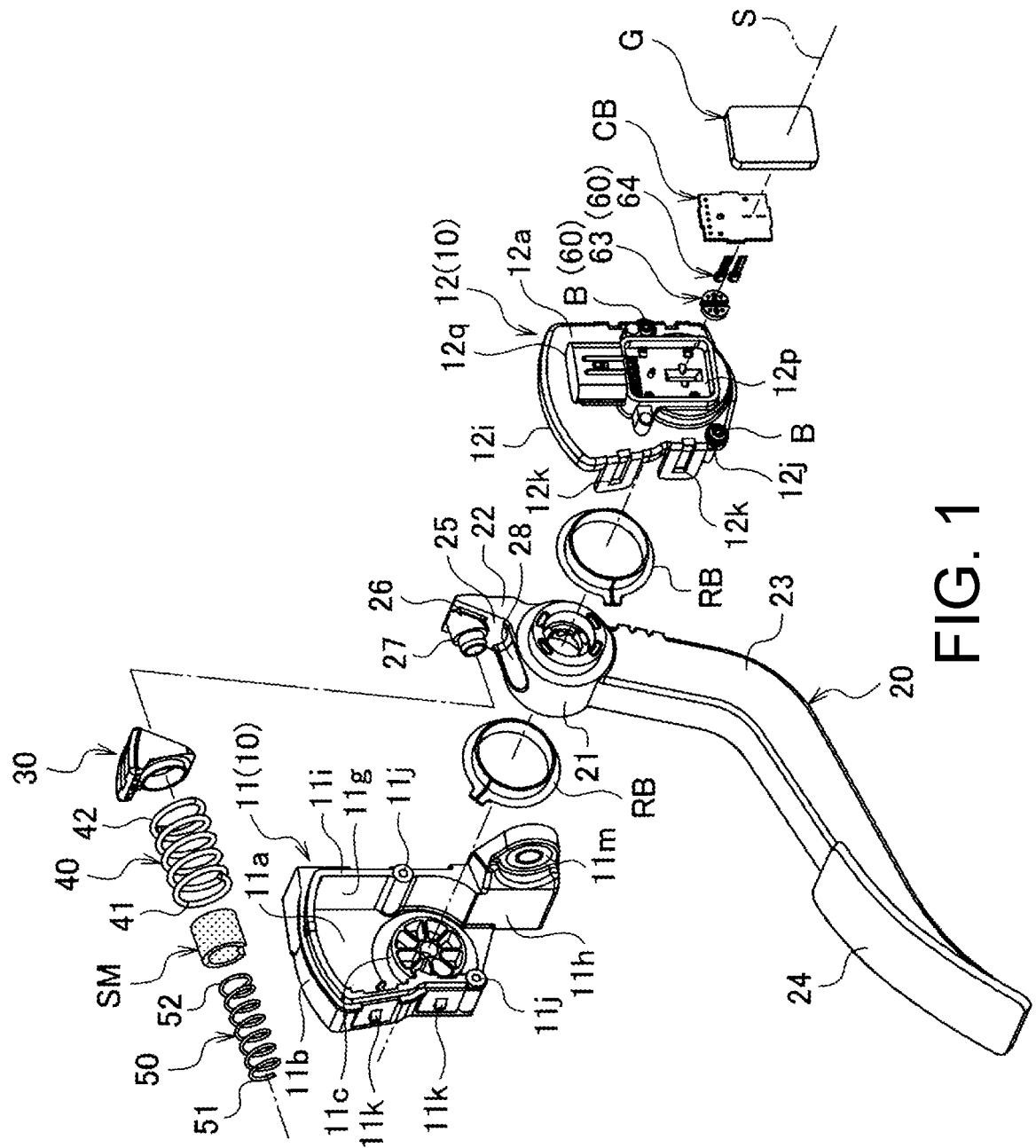
FIG. 1 is an exploded perspective view showing an embodiment of an accelerator pedal device according to the present invention.
Figure 2:
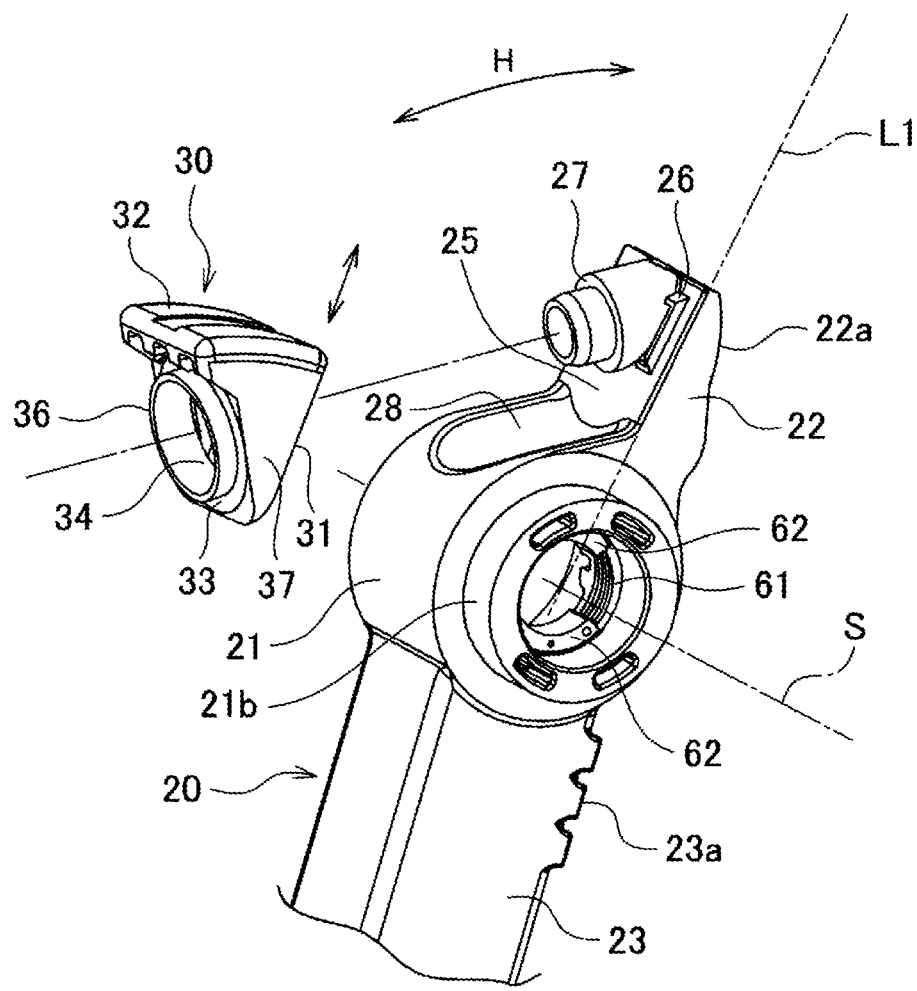
FIG. 2 is a partial perspective view showing a pedal arm and a slider included in the accelerator pedal device shown in FIG. 1.
Figure 3:
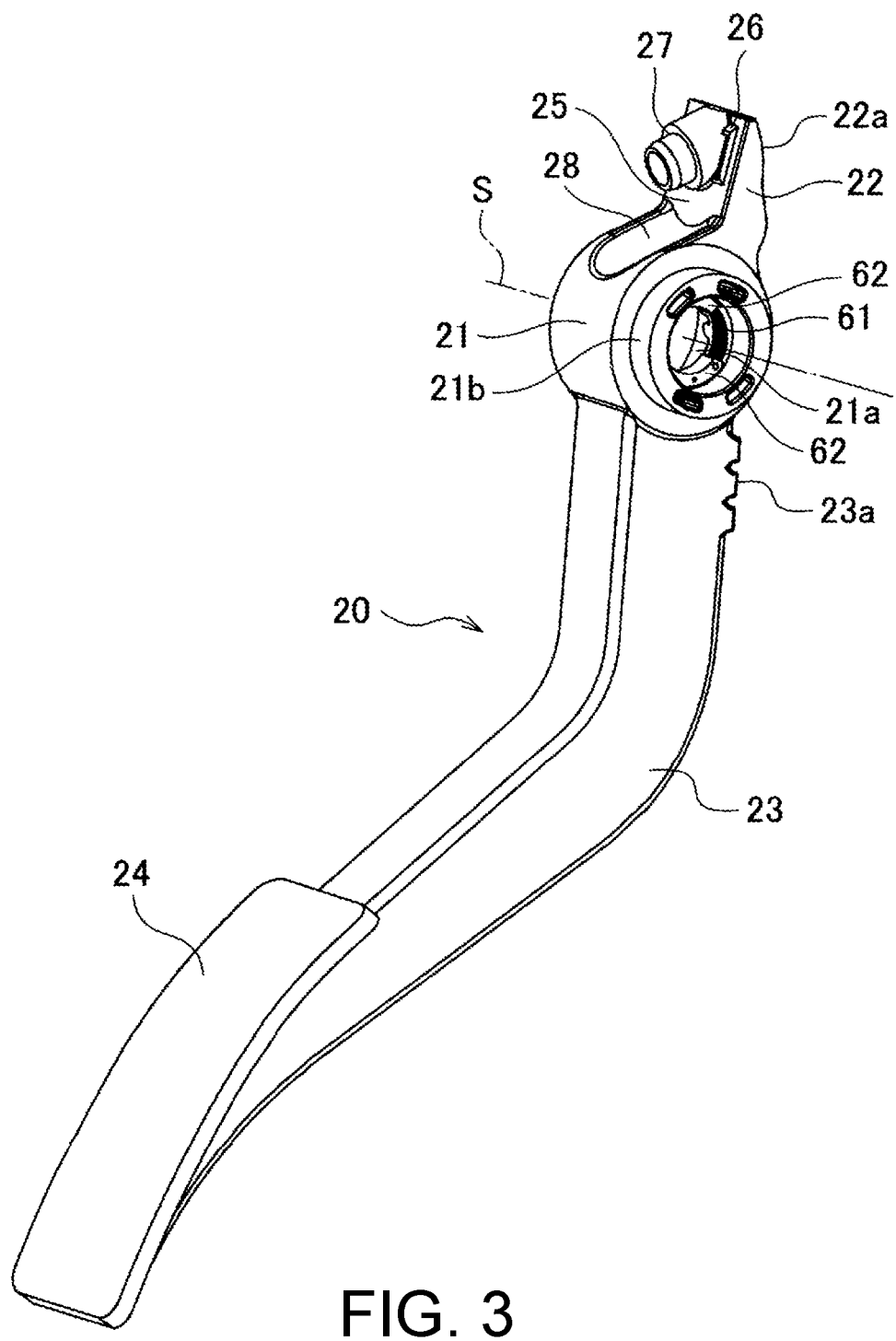
FIG. 3 is a perspective view showing an accelerator pedal and the pedal arm included in the accelerator pedal device shown in FIG. 1.
Figure 4A:
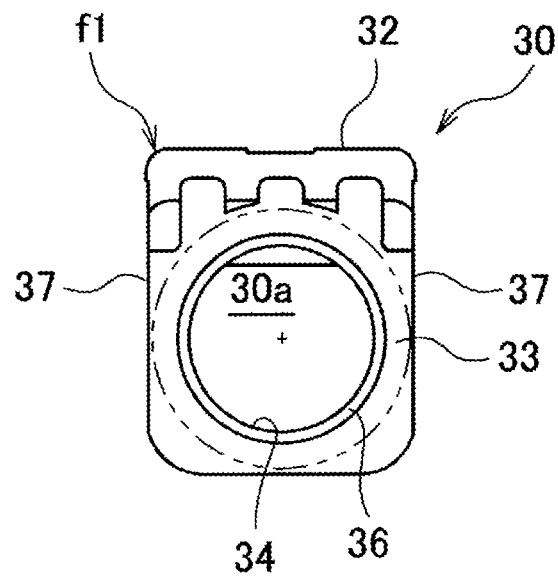
FIG. 4A is a front view showing the slider included in the accelerator pedal device shown in FIG. 1, as viewed from a biasing spring side in a swing direction (sliding direction).
Figure 4B:
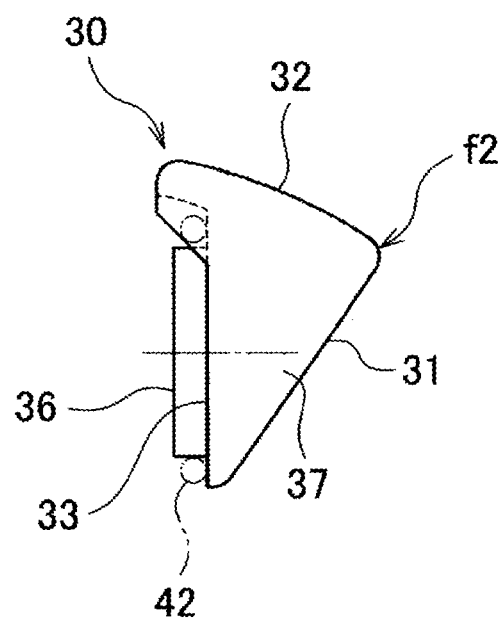
FIG. 4B is a side view showing the slider included in the accelerator pedal device shown in FIG. 1, as viewed in a lateral direction perpendicular to the swing direction.
Figure 4C:
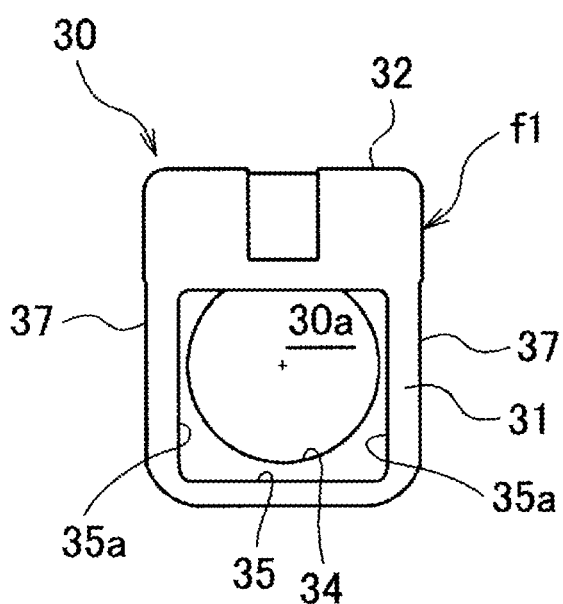
FIG. 4C is a rear view showing the slider included in the accelerator pedal device shown in FIG. 1, as viewed from a contact part side in the swing direction.

Hereinafter, an embodiment of the present invention will be described with reference to FIGS. 1 to 13 of the accompanying drawings.

An accelerator pedal device according to the present embodiment includes a housing 10 fixed to a car body of a car or the like, a pedal arm 20, a slider 30, a biasing spring 40, a return spring 50, and a position sensor 60 for detecting a rotational angle position of the pedal arm 20.

The position sensor 60 is configured by an armature 61, permanent magnets 62, stators 63, and Hall elements 64.

In addition, a hysteresis-causing mechanism for generating hysteresis in depressing force of an accelerator pedal 24 is configured by a contact part 25 forming a part of the pedal arm 20, the slider 30, and the biasing spring 40.

The housing 10 is made of a resin material, and is configured by a first housing 11 and a second housing 12 which are connected to each other to define an axis S.

The first housing 11 includes a side wall part 11a substantially perpendicular to the axis S, an outer peripheral wall part 11b surrounding a periphery of the axis S, a support shaft 11c centered on the axis S, a sliding surface 11d, spring receiving parts 11e and 11f, a rest stopper 11g, a fully open stopper 11h, a connection part 11i for connecting the second housing 12, screw holes 11j into which screws B connecting the second housing 12 are screwed, protruding parts 11k for snap fitting, and a flange part 11m having a through hole through which a bolt fixed to a car body or the like passes.

The support shaft 11c is formed in a cylindrical shape in order to swingably support a cylindrical part 21 of the pedal arm 20 around the axis S.

The sliding surface 11d is formed as an arcuate surface having a predetermined radius R (a curvature 1/R) centered on the axis S on an inner wall of the outer peripheral wall part 11b having a predetermined width in the axis S direction.

The spring receiving part 11e is formed as an annular seating surface for receiving one end part 41 of the biasing spring 40 on the inner wall of the outer peripheral wall part 11b.

The spring receiving part 11f is formed as an annular seating surface for receiving one end part 51 of the return spring 50 on a concentrically inner side of the spring receiving part 11e on the inner wall of the outer peripheral wall part 11b.

Here, the side wall part 11a and the outer peripheral wall part 11b are formed to define one concave part C in which the biasing spring 40 and the return spring 50 are coaxially disposed in a nested manner with the pedal arm 20 and the slider 30 assembled.

Further, the concave part C is closed by a side wall part 12a of the second housing 12 to form one internal space which is curved in the sliding direction (swing direction) H of the slider 30 and of which a cross-section perpendicular to the sliding direction H forms a substantially rectangular shape, so that the slider 30 can be slidably received.

The second housing 12 includes the side wall part 12a substantially perpendicular to the axis S, a fitting recess 12c centered on the axis S, a connection part 12*i* connected to the first housing 11, holes 12*j* through which screws B screwed into the first housing 11 pass, concave parts 12*k* for snap fitting, a cylinder-shaped embedding part 12*n* for embedding the stator 63 and the Hall element 64 which are a part of the position sensor 60, an accommodating part 12*p* for accommodating a circuit board CB, and a connector 12*q* for making an electrical connection.

The fitting recess 12*c* is formed in a cylindrical shape to swingably support the cylindrical part 21 of the pedal arm 20 about the axis S.

The embedding part 12*n* is formed to be inserted inside the cylindrical part 21 of the pedal arm 20 with the second housing 12 connected to the first housing 11 such that it faces the armature 61 and the permanent magnet 62 which are a part of the position sensor 60 disposed inside the cylindrical part 21.

Further, the second housing 12 is connected to the first housing 11 by a snap fit coupling and is fastened by the screws B, whereby it covers the entire area of the pedal arm 20 except for its lower section in cooperation with the first housing 11 in a state where the pedal arm 20, the slider 30, the biasing spring 40, and the return spring 50 are mounted on the first housing 11.

The pedal arm 20 is generally made of a resin material, and includes the cylindrical part 21, an upper arm 22 extending upward from the cylindrical part 21, a lower arm 23 extending downward from the cylindrical part 21, the accelerator pedal 24, the contact part 25, guide parts 26, a spring receiving part 27, and a concave relief part 28.

Here, an upper side and a lower side indicate the upper side and the lower side in a vertical direction when the accelerator pedal device is mounted on a vehicle or the like.

In order for the pedal arm 20 to be swingably supported about the axis S, the cylindrical part 21 includes an inner circumferential surface 21*a* fitted into the support shaft 11*c* of the first housing 11 via a bearing RB, an outer circumferential surface 21*b* fitted into the fitting recess 12*c* of the second housing 12 via a bearing RB, and an inner circumferential surface 21*c* on which the armature 61 and the permanent magnet 62 of the position sensor 60 are disposed.

The upper arm 22 has an abutting part 22*a* that abuts the rest stopper 11*g* in a rest position.

The lower arm 23 has an abutting part 23*a* that abuts a fully open stopper 11*h* in a maximum depressing position.

The contact part 25 is formed as a flat surface that contacts the slider 30 in an area facing the sliding direction H of the upper arm 22 and on a first straight line L1 passing through the axis S, that is, on a plane including the axis S and the first straight line L1 orthogonal to the axis S.

Also, the contact part 25 is formed to exert pressing force to the slider 30 while it comes into releasable contact with the slider 30 in the swing direction H, and to slidably come into contact with the slider 30 in accordance with a swinging motion of the pedal arm 20 in a direction along the first straight line L1.

The guide parts 26 are formed into protrusions which protrude from the contact part 25 and extend in the direction of the first straight line L1 at two places separated in the axis S direction in an area facing the sliding direction H of the upper arm 22 and in the vicinity of the contact part 25.

The two guide parts 26 are formed to guide two inner edges 35*a* of the slider 30, that is, to guide the slider 30 in the direction of the first straight line L1 toward the inner wall (sliding surface 11*d*) of the housing 10.

The spring receiving part 27 is formed to protrude in a two-stepped cylinder shape that defines an annular seating surface in an area facing the sliding direction H of the upper arm 22 and in the vicinity of the contact part 25.

The annular seating surface of the spring receiving part 27 is positioned on a third straight line L3 that forms a predetermined acute angle θ with the first straight line L1 on a side closer to the contact part 25 than the axis S.

Also, the other end part 52 of the return spring 50 passes through a through hole 30*a* of the slider 30 in a non-contact manner, and the spring receiving part 27 is configured to abut the other end part 52 of the return spring 50 from a direction perpendicular to the third straight line L3 to receive it.

The concave relief part 28 is formed by cutting off an outer peripheral region of the cylindrical part 21 in a groove shape extending in an expansion and contraction direction of the biasing spring 40.

Also, the concave relief part 28 is formed such that the biasing spring 40 compressed between the spring receiving part 11*e* of the housing 10 and a spring receiving part 33 of the slider 30 can be disposed in a non-contact manner.

According to the above, since the biasing spring 40 can be disposed in the vicinity of the cylindrical part 21, components can be integrated around the axis S while securing the function of the hysteresis-causing mechanism, whereby miniaturization of the device can be achieved.

The slider 30 is made of a resin material, for example, a highly slidable material such as oil-impregnated polyacetal. The slider 30 is formed to include a first outer contour part f1 which has an outer contour on a surface perpendicular to the swing direction H formed in a substantially rectangular shape, and a second outer contour part f2 which has an outer contour on a surface parallel to the swing direction H formed in a substantially fan shape.

Also, the slider 30 is formed to define the through hole 30*a* as a punched area penetrating in the swing direction H, and includes a first contact surface 31, a second contact surface 32, the spring receiving part 33, a circular opening 34, a rectangular opening 35, the cylindrical restriction part 36, and two side surfaces 37.

The first contact part 31 is formed as a flat surface having a substantially rectangular ring shape in a plane perpendicular to the swing direction (sliding direction) H.

Also, the first contact part 31 slidably comes in contact with the contact part 25 on the first straight line L1, and can be releasable from the contact part 25 in the swing direction H.

The second contact part 32 is formed as an arcuate surface which is convexly curved and has a predetermined radius R (curvature 1/R) in a plane perpendicular to the axis S.

Also, the second contact part 32 is formed to slide on the sliding surface 11*d* of the housing 10 in the sliding direction H.

The spring receiving part 33 is formed as a flat annular seating surface facing the swing direction (sliding direction) H.

In a state where the slider 30 is assembled, the annular seating surface of the spring receiving part 33 is positioned on a second straight line L2 that forms a predetermined acute angle θ with the first straight line L1 on a side closer to the contact part 25 than the axis S.

Also, the spring receiving part 33 is formed to abut the other end part 42 of the biasing spring 40 in a direction perpendicular to the second straight line L2 to receive it.

According to the above, the biasing force of the biasing spring 40 acts to press the slider 30 against the sliding surface 11*d* of the housing 10 in the direction perpendicular to the second straight line L2. Accordingly, the frictional force due to the sliding thereof can be adjusted by appropriately selecting the predetermined acute angle θ formed by the first straight line L1 and the second straight line L2.

Therefore, it is possible to set desired hysteresis characteristics in accordance with a specification of the accelerator pedal device.

The circular opening 34 is formed to receive the return spring 50 in the through hole 30a in a non-contact manner.

Thus, the other end part 52 of the return spring 50 is disposed to abut the spring receiving part 27 of the pedal arm 20 through the circular opening 34 and the through hole 30a.

The rectangular opening 35 is formed to pass the spring receiving part 27 of the pedal arm 20 in a non-contact manner, and to define the two inner edges 35a extending in parallel with the first straight line L1.

Also, the two inner edges 35a are formed to come into contact with the two guide parts 26 of the pedal arm 20 from both sides in the axis S direction.

Therefore, the slider 30 is guided by the guide part 26 such that it can reciprocate in the direction of the first straight line L1 toward the sliding surface 11d of the housing 10.

The cylindrical restriction part 36 is formed to protrude in a cylindrical shape in an inner area of the spring receiving part 33 and in an edge area of the circular opening 34.

Also, in a state where the other end part 42 of the biasing spring 40 abuts the spring receiving part 33, the cylindrical restriction part 36 is configured to be fitted inside the biasing spring 40 to restrict displacement of the biasing spring 40 from the spring receiving part 33.

The two side surfaces 37 are formed as substantially flat surfaces parallel to a plane perpendicular to the axis S.

In addition, in the assembled state, a width between the two side surfaces 37 in the axis S direction is formed to be such a size that the two side surfaces 37 are not in contact with an inner wall surface of the side wall part 11a of the first housing 11 and an inner wall surface of the side wall part 12a of the second housing 12.

Further, the width may be such a size that a frictional resistance is minimized even when they are in contact.

The slider 30 having the above configuration can be formed such that a partial area of the first outer contour part f1 and an arc area of the second outer contour part f2 slide on the inner wall (sliding surface 11d) of the housing 10, and one side of the second outer contour part f2 in the swing direction H is in contact with the contact part 25 and the other side thereof receives the biasing spring 40. Therefore, the slider 30 can be easily molded using a resin material or the like as one component having a simple form while achieving weight reduction.

The biasing spring 40 is a compression type coil-like expansion and contraction spring made of spring steel or the like, and is mounted such that one end part 41 thereof abuts the spring receiving part 11e of the first housing 11 and the other end part 42 thereof abuts the spring receiving part 33 of the slider 30, so that it can be expanded and contracted in the swing direction H while being compressed to a predetermined compression margin.

Also, the biasing spring 40 is configured to exert biasing force for returning the pedal arm 20 to the rest position via the slider 30, and to exert biasing force for pressing the slider 30 against the sliding surface 11d in cooperation with the contact part 25.

Figure 7:
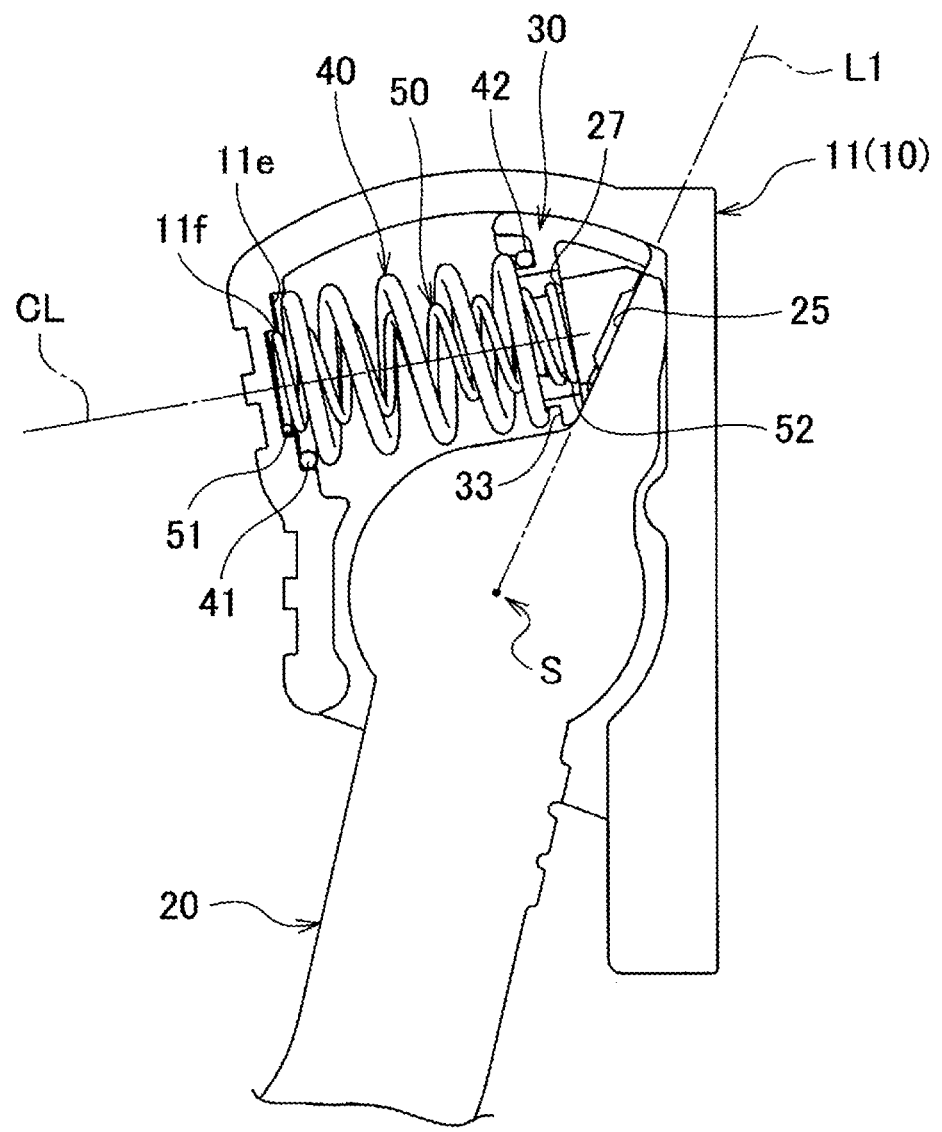
FIG. 7 is a schematic view showing a state of a biasing spring and a return spring when the pedal arm is positioned at a rest position in the accelerator pedal device shown in FIG. 1.
Figure 8:
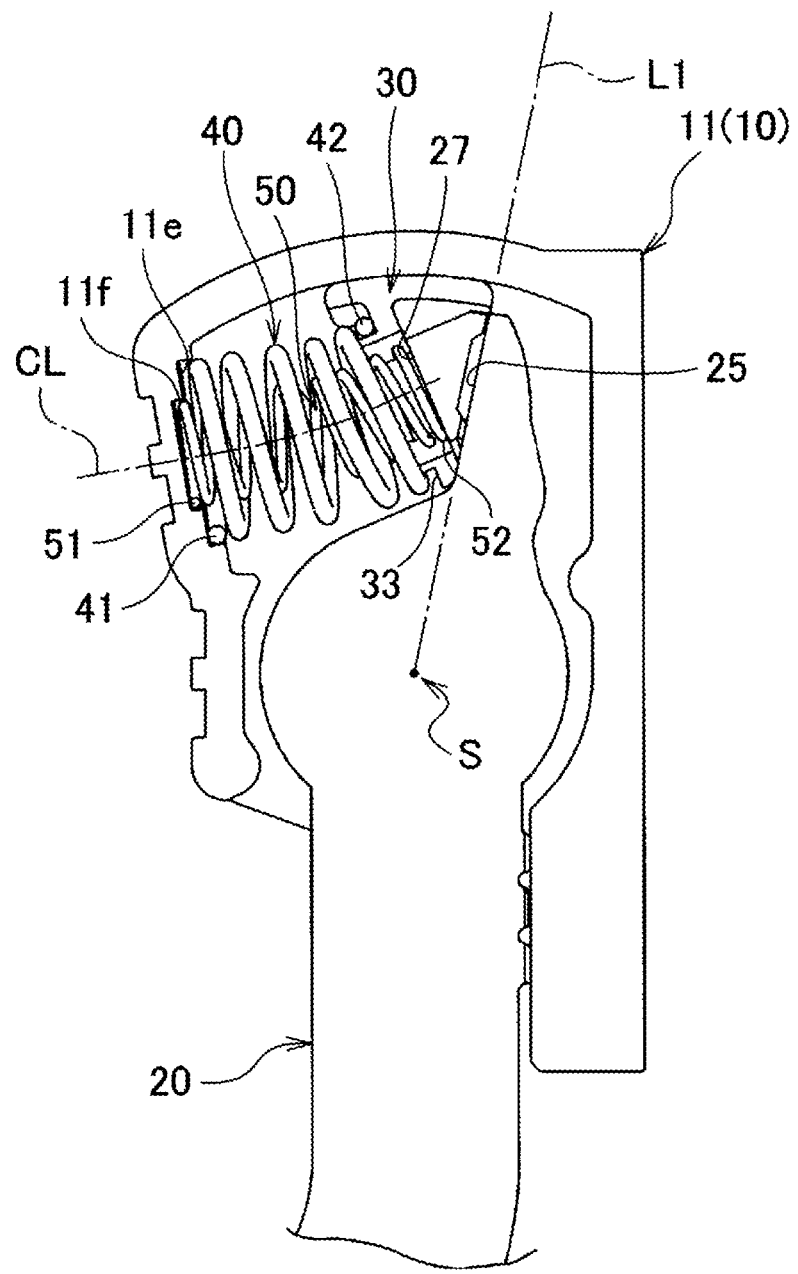
FIG. 8 is a schematic view showing a state of the biasing spring and the return spring when the pedal arm is positioned at a maximum depressing position in the accelerator pedal device shown in FIG. 1.

Here, the biasing spring 40 is disposed such that its center line CL is straight as shown in FIG. 7 in the rest position, and is disposed to be convexly curved toward the axis S side as shown in FIG. 8 between the rest position and the maximum depressing position.

According to the above, in the hysteresis characteristics obtained by the hysteresis-causing mechanism, the desired stable depressing force can be obtained in a region where a depressing stroke of the pedal is small.

Figure 9:
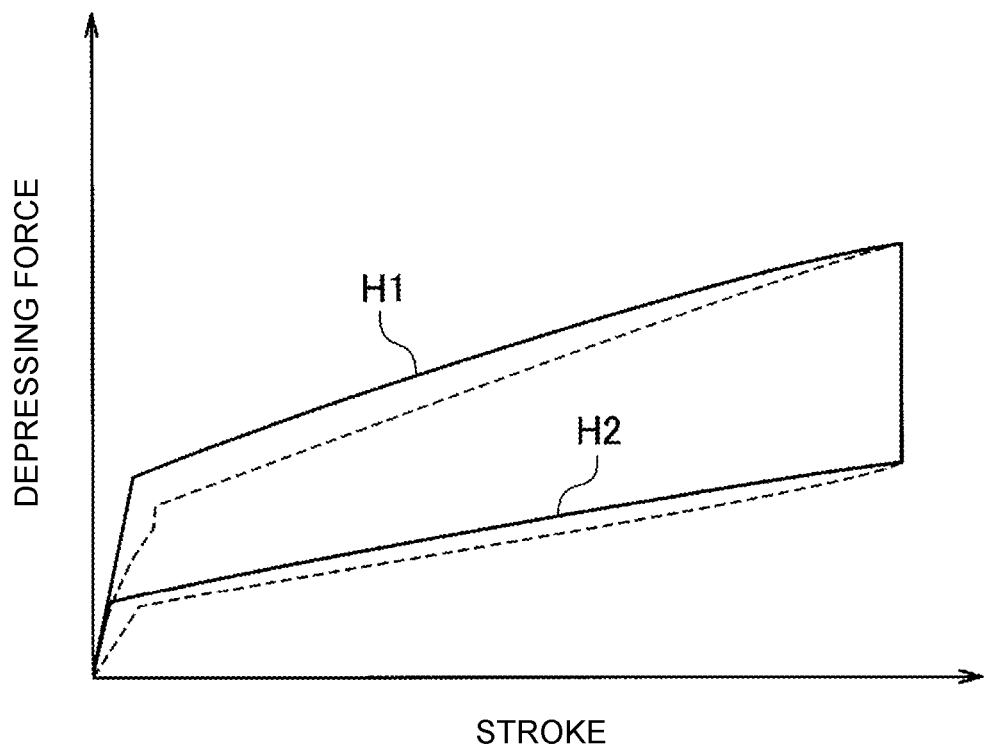
FIG. 9 is a graph showing depressing force characteristics of the accelerator pedal device shown in FIG. 1.

Referring to FIG. 9, if the center line CL of the biasing spring 40 is disposed to be curved at the rest position, the depressing force has the characteristics shown by the dotted line in FIG. 9, in which since bending characteristics occur in the region where the depressing stroke is small, the desired depressing force cannot be obtained.

On the other hand, when the center line CL of the biasing spring 40 is disposed to be straight at the rest position, the desired stable depressing force can be obtained in the region where the depressing stroke is small, as shown by the solid line in FIG. 9.

The return spring 50 is a compression type coil-like expansion and contraction spring made of spring steel or the like, and is mounted such that one end part 51 thereof abuts the spring receiving part 11f of the first housing 11 and the other end part 52 thereof abuts the spring receiving part 27 of the pedal arm 20, so that it can be expanded and contracted in the swing direction H while being compressed to a predetermined compression margin.

In addition, the return spring 50 is formed to have an outer diameter smaller than an inner diameter of the biasing spring 40, and is coaxially disposed inside the biasing spring 40 in a nested manner so as not to be in contact with the biasing spring 40.

Also, the return spring 50 is configured to exert biasing force directly on the pedal arm 20 in order to return the pedal arm 20 to the rest position.

Here, the return spring 50 is disposed such that its center line CL is straight as shown in FIG. 7 in the rest position, similarly to the biasing spring 40, and is disposed to be convexly curved toward the axis S side as shown in FIG. 8 between the rest position and the maximum depressing position.

Thus, it is possible to prevent the return spring 50 from interfering with the biasing spring 40 during the operation of expansion and contraction.

Here, an interposed member SM formed in a cylindrical shape with flexible sponge, rubber, resin or the like may be interposed between an outer circumference of the return spring 50 and an inner circumference of the biasing spring 40.

According to the above, when the biasing spring 40 and the return spring 50 are in the operation of expansion and contraction, the interposed member SM is interposed therebetween so that the mutual interference can be more reliably prevented, and therefore, it is possible to prevent occurrence of a collision noise and the like.

In addition, by disposing the return spring 50 and the biasing spring 40 in the same area (concave part C) in the housing 10, the disposition space can be narrowed compared to a case where they are disposed in different areas.

Therefore, desired hysteresis characteristics can be obtained while achieving simplification of the structure, miniaturization of the housing 10, and miniaturization of the device, due to the integration of components.

In particular, since the biasing spring 40 and the return spring 50 are coaxially disposed in a nested manner, the disposition area can be sufficiently secured by securing the area actually occupied by the biasing spring 40, which can further contribute to the miniaturization of the housing 10, the miniaturization of the device, or the like.

Further, the return spring 50 is formed to be directly engaged with the spring receiving part 27 of the pedal arm 20 to exert biasing force for returning the pedal arm 20 to the rest position. Accordingly, even if such a malfunction in which the slider 30 sticks to the sliding surface 11d of the housing 10 to be stopped occurs, the pedal arm 20 is reliably returned to the rest position due to the biasing force of the return spring 50, whereby the safety is guaranteed.

The position sensor 60 is disposed in the cylindrical part 21 of the pedal arm 20 and the embedding part 12n of the second housing 12 in an area around the axis S of the pedal arm 20.

The position sensor 60 is, for example, a non-contact type magnetic sensor, and is configured by an annular armature 61, a pair of permanent magnets 62, two stators 63, and two Hall elements 64.

The armature 61 is formed in an annular shape with a magnetic material, and is fixed to the inner circumferential surface 21c of the cylindrical part 21 of the pedal arm 20.

The pair of permanent magnets 62 is formed in an arc shape and is coupled to an inner circumferential surface of the armature 61.

The two stators 63 are made of a magnetic material, and is embedded in the embedding part 12n of the second housing 12.

The two Hall elements 64 are embedded in the embedding part 12n of the second housing 12 while being disposed between the two stators 63.

In addition, the circuit board CB is disposed in the accommodating part 12p of the second housing 12 and is sealed by a seal member G.

The circuit board CB includes a circuit that electrically connects the Hall elements 64 and mounts various electronic components.

Also, the position sensor 60 detects a change in magnetic flux density caused by the swinging of the pedal arm 20 by the Hall element 64 and outputs it as a voltage signal. The output signal is detected as information on an angular position of the pedal arm 20 by a detector (not shown) connected to the connector 12q.

An operation of the hysteresis-causing mechanism configured by the slider 30, the contact part 25 and the biasing spring 40 will be described below with reference to FIGS. 5, 9 and 10 to 12.

Figure 5:
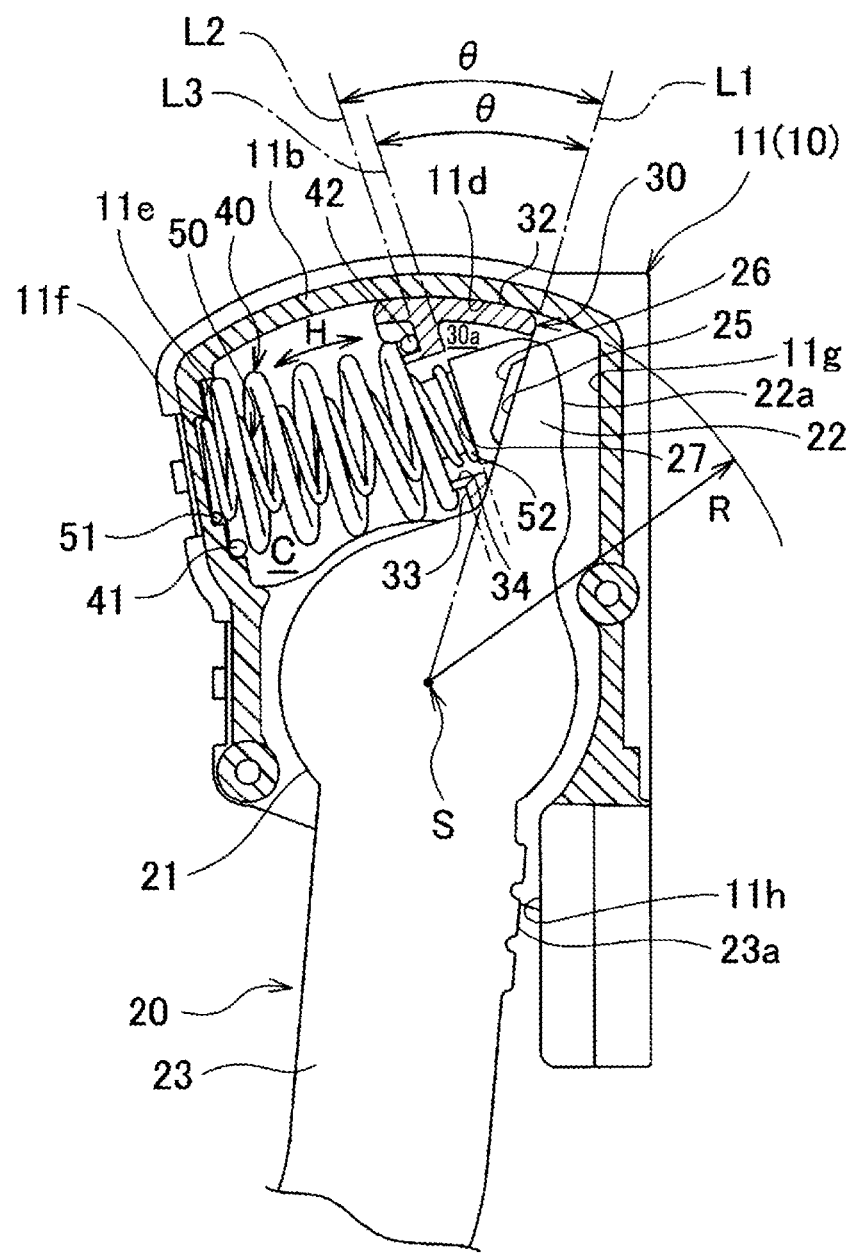
FIG. 5 is a partial cross-sectional view showing an inside of the accelerator pedal device shown in FIG. 1.
Figure 6:
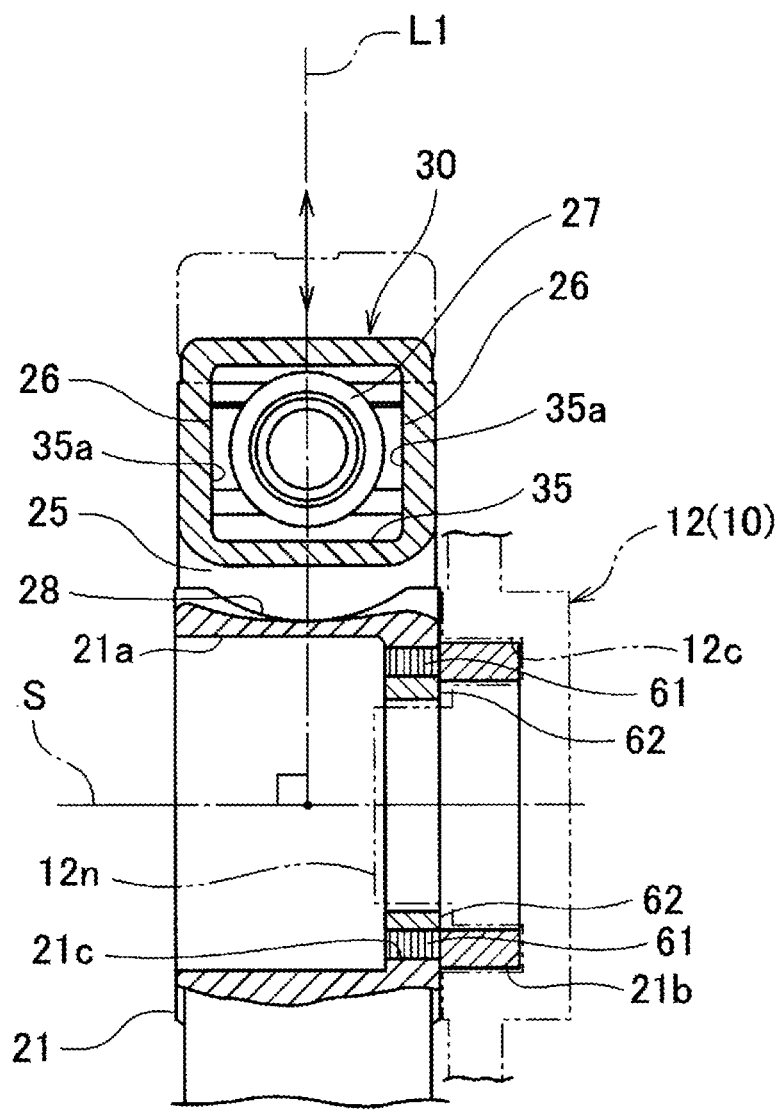
FIG. 6 is a partial cross-sectional view showing a relationship between the slider and a guide part and a contact part of the pedal arm included in the accelerator pedal device shown in FIG. 1.
Figure 10:
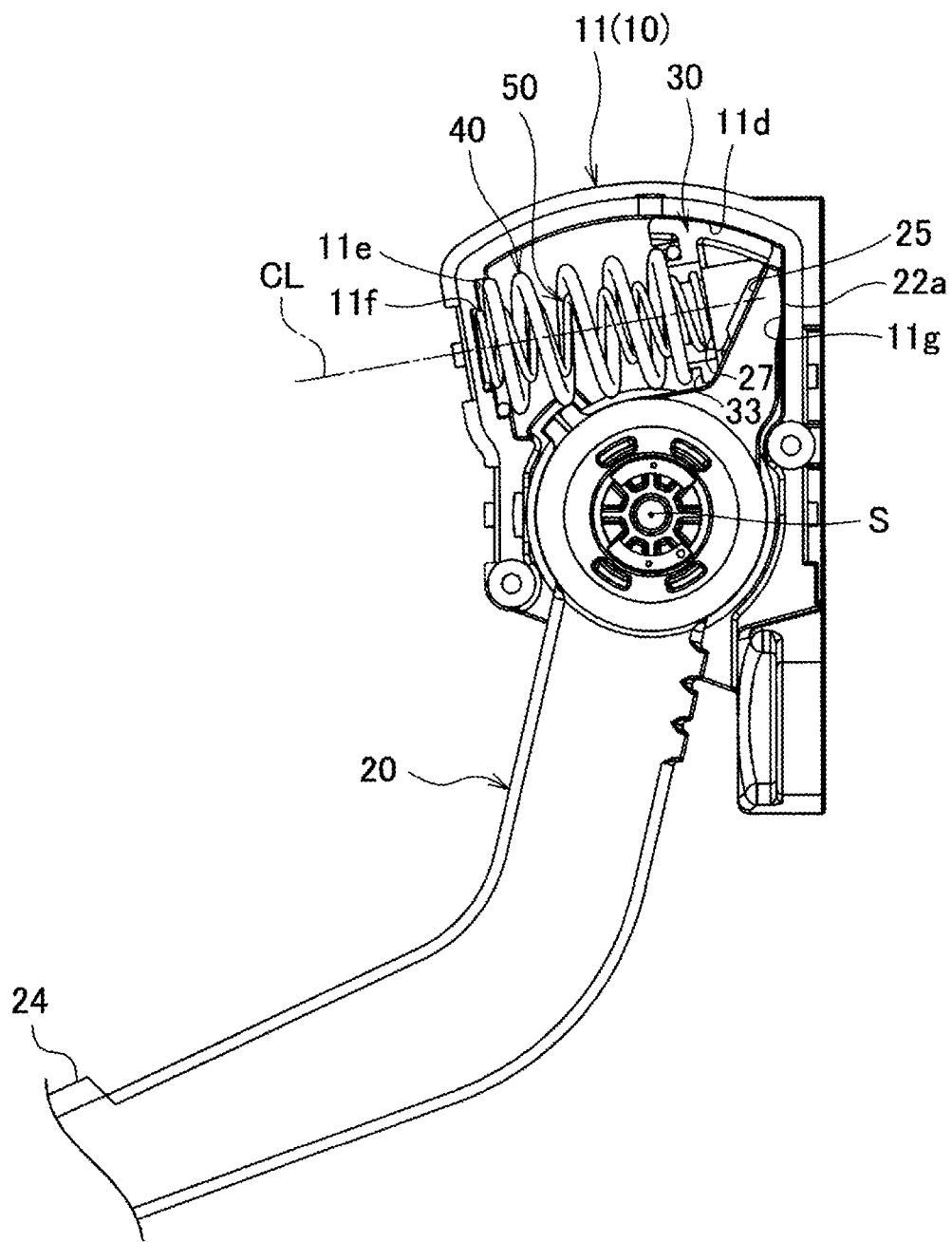
FIG. 10 is a cross-sectional view showing a state in which the pedal arm is at the rest position in the accelerator pedal device shown in FIG. 1.
Figure 11:
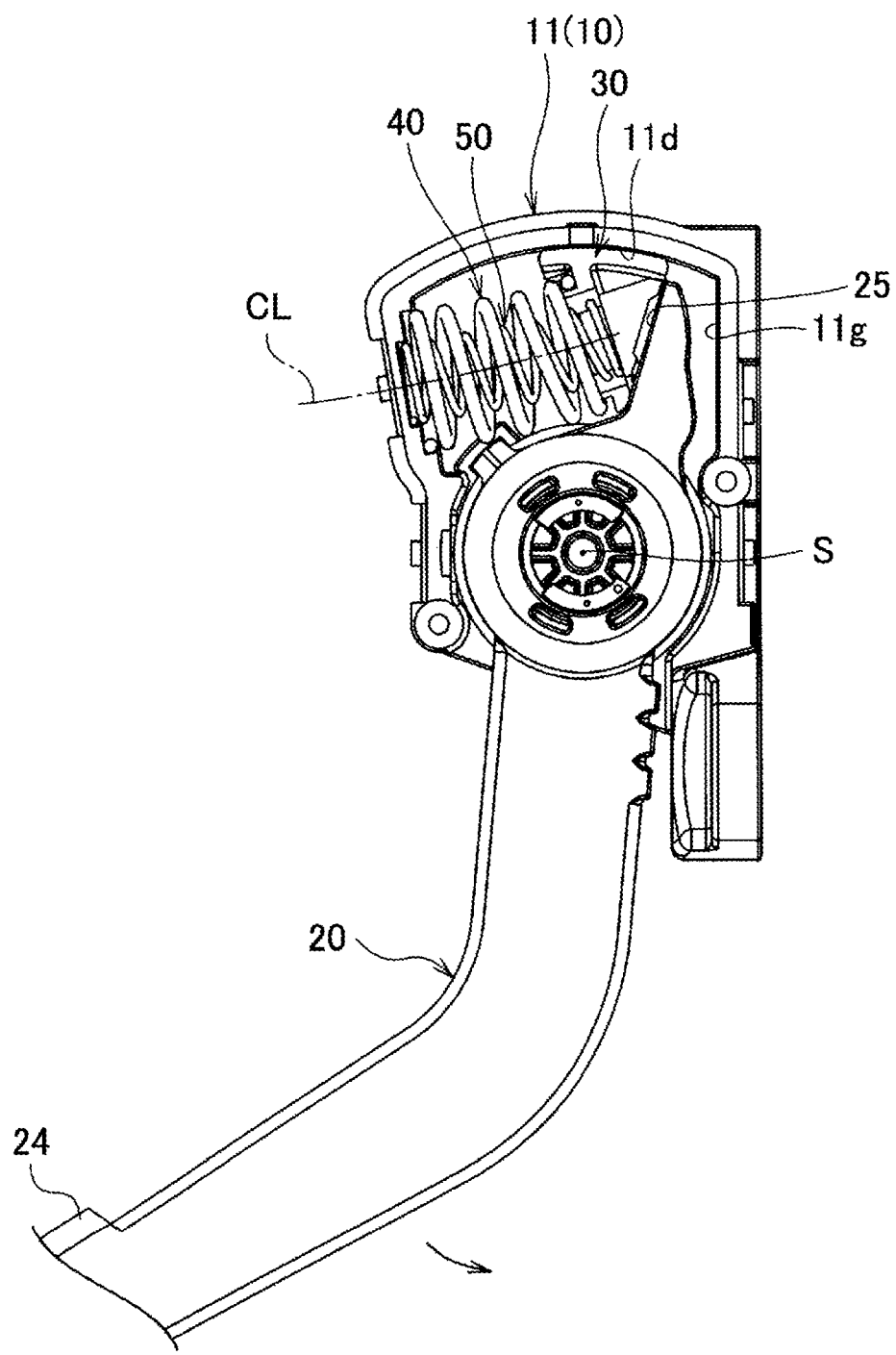
FIG. 11 is a cross-sectional view showing a state in which the pedal arm is at a midway position between the rest position and the maximum depressing position in the accelerator pedal device shown in FIG. 1.
Figure 12:
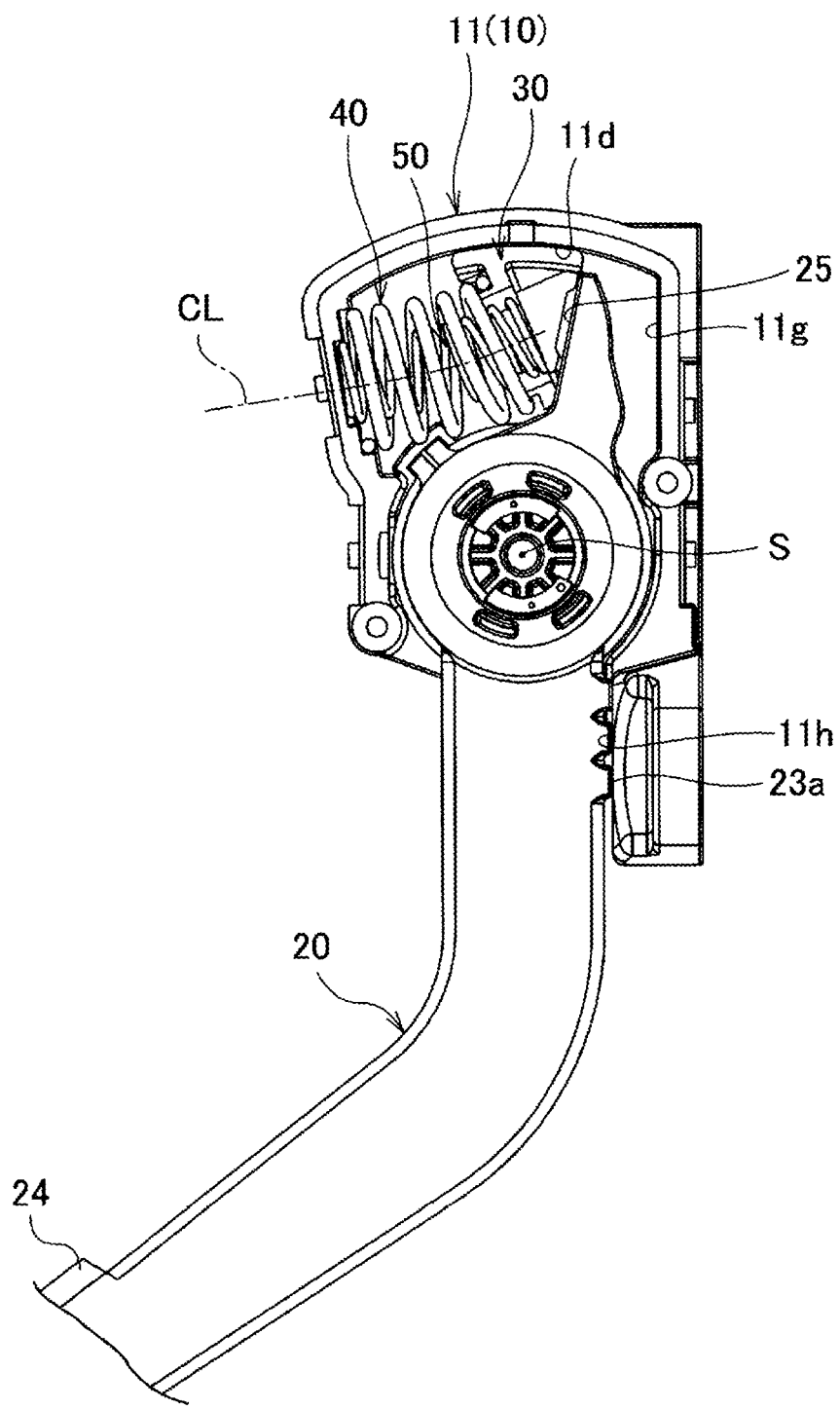
FIG. 12 is a cross-sectional view showing a state in which the pedal arm is at the maximum depressing position in the accelerator pedal device shown in FIG. 1.

First, when the pedal arm 20 is depressed against the biasing force of the return spring 50 and the biasing spring 40 from the rest position shown in FIG. 10 through the midway position shown in FIG. 11 toward the maximum depressing position (full open position) shown in FIG. 12, the contact part 25 presses the slider 30 leftward in FIG. 5 against the biasing force of the biasing spring 40.

At this time, a frictional force (a sliding resistance) is generated between the second contact surface 32 of the slider 30 and the sliding surface 11d of the housing 10 due to the wedge action exerted by the contact part 25 while pressing the first contact surface 31 of the slider 30. This frictional force acts in a direction opposite to a moving direction of the slider 30, that is, in a direction opposite to the depressing operation.

Therefore, since the frictional force acting in the same direction is added to the biasing force of the biasing spring 40 which increases in accordance with the depressing operation, the depressing force increases linearly as a depressing amount (stroke) of the pedal increases, as indicated by H1 in FIG. 9.

On the other hand, when the pedal arm 20 is returned toward the rest position in accordance with the biasing force of the return spring 50 and the biasing spring 40, the slider 30 follows the contact part 25 due to the biasing force of the biasing spring 40 and moves rightward in FIG. 5.

At the time of this return operation, the frictional force (sliding resistance) generated due to the wedge action caused while the contact part 25 presses the first contact surface 31 of the slider 30 acts in the direction opposite to the moving direction of the slider 30, that is, in a reverse direction as opposed to the case of the depressing operation.

Therefore, since the frictional force acting in the reverse direction is added to the biasing force of the biasing spring 40 which decreases in accordance with the returning operation, the depressing force decreases linearly as the depressing amount (stroke) of the pedal decreases, as indicated by H2 in FIG. 9.

Here, since the depressing force in the returning operation is smaller than the depressing force in the depressing operation, hysteresis (H1 and H2) can be generated in the entire depressing force (pedal load) from the depressing operation to the returning operation, as shown in FIG. 9.

Next, an operation of the accelerator pedal device will be described with reference to FIGS. 10 to 13.

First, when the accelerator pedal 24 is in the rest position where a driver does not depress it, as shown in FIG. 10, the contact part 22a of the upper arm 22 of the pedal arm 20 abuts the rest stopper 11g due to the biasing force of the return spring 50 and the biasing spring 40, and the pedal arm 20 is stopped at the rest position.

At this time, the contact part 25 of the pedal arm 20 is in a releasable contact with the first contact surface 31 of the slider 30 on the first straight line L1.

Further, in the rest position shown in FIG. 10, the front of the spring receiving part 11e and the front of the spring receiving part 33 face each other, and the front of the spring receiving part 11f and the front of the spring receiving part 27 face each other, whereby the center lines CL of the biasing spring 40 and the return spring 50 are in a linear state.

When the driver depresses the accelerator pedal 24 from the above state, the pedal arm 20 rotates counterclockwise against the biasing force of the return spring 50 and the biasing spring 40 as shown in FIG. 11, and further rotates to the maximum depressing position (full open position) shown in FIG. 12 while increasing the resistance load generated by the hysteresis-causing mechanism (H1 in FIG. 9), so that the abutting part 23a abuts on the fully open stopper 11h and stops.

Further, as shown in FIGS. 11 to 12, the center line CL of the biasing spring 40 and the return spring 50 is convexly curved toward the axis S side.

On the other hand, when the driver releases the depressing force, the pedal arm 20 rotates toward the rest position due to the biasing force of the return spring 50 and the biasing spring 40 while allowing the driver to receive a resistance load (pedal load) smaller than the resistance load (pedal load) at the time of depressing, and the contact part 22a contacts the rest stopper 11g while reducing the resistance load generated by the hysteresis-causing mechanism (H2 in FIG. 9), whereby the pedal arm 20 stops at the rest position shown in FIG. 10.

Figure 13:
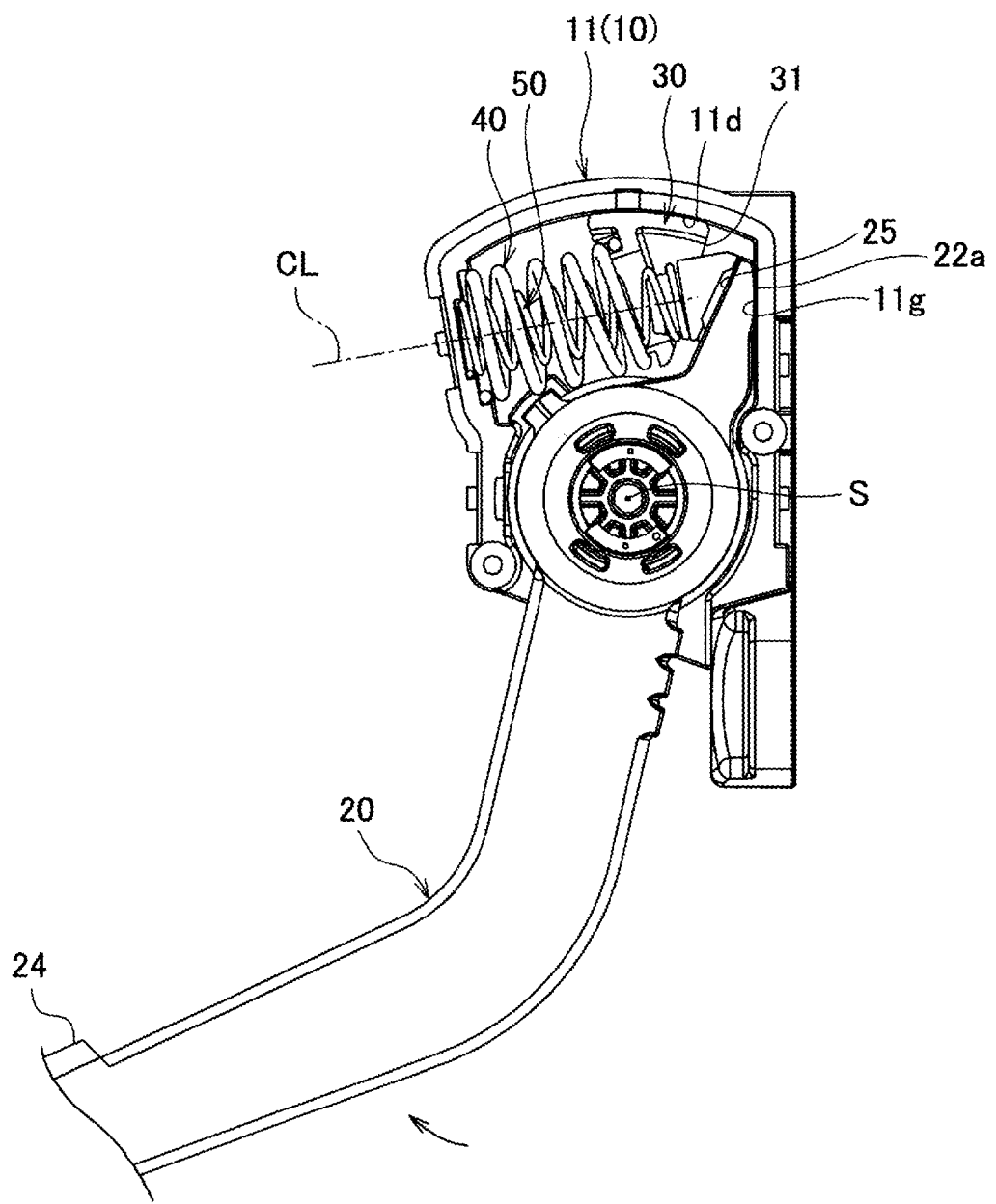
FIG. 13 is a cross-sectional view showing a state in which the slider has stopped halfway and the pedal arm has returned to the rest position in the accelerator pedal device shown in FIG. 1.

Further, when the driver returns the accelerator pedal 24, even if the slider 30 is stuck to the inner wall of the housing 10 due to the sticking or the like and does not return, the biasing force of the return spring 50 causes the contact part 25 to be released from the first contact surface 31 of the slider 30, whereby the pedal arm 20 reliably returns to the rest position, as shown in FIG. 13.

Therefore, the position sensor 60 detects that the pedal arm 20 has returned to the rest position, a desired control can be performed in conjunction with the driver's returning operation.

Figure 14:
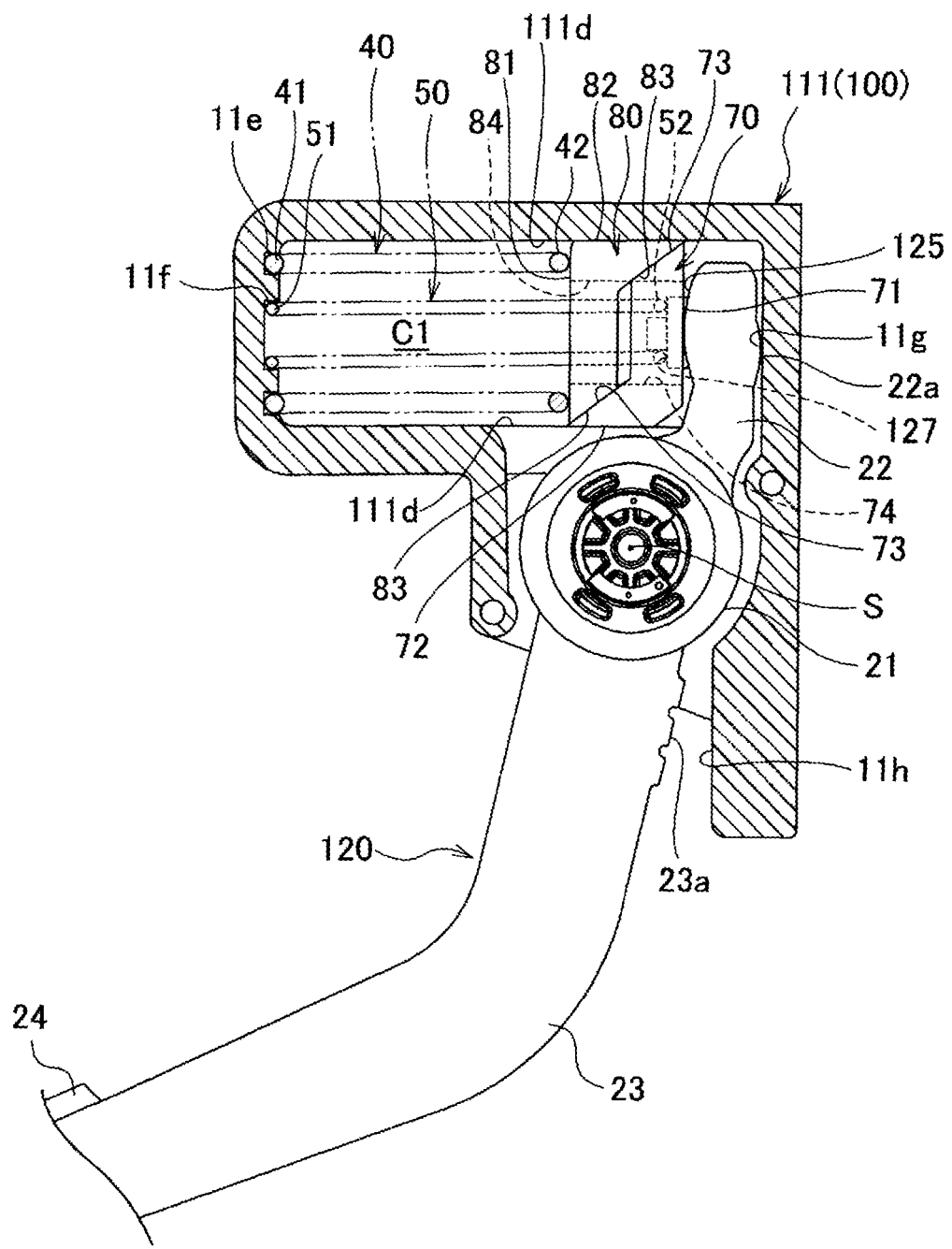
FIG. 14 is a cross-sectional view showing another embodiment of the accelerator pedal device according to the present invention.

FIG. 14 shows another embodiment of the accelerator pedal device according to the present invention. In the present embodiment, the same components as described above are denoted by the same reference numerals, and the description thereof will be omitted.

As shown in FIG. 14, an accelerator pedal device according to the present embodiment includes a housing 100 including a first housing 111, a pedal arm 120, a first slider 70, a second slider 80, a biasing spring 40, a return spring 50, and a position sensor 60.

The position sensor 60 is configured by an armature 61, permanent magnets 62, stators 63, and Hall elements 64.

Further, a hysteresis-causing mechanism for generating hysteresis in the depressing force of an accelerator pedal 24 is configured by the first slider 70, the second slider 80, and the biasing spring 40.

The first housing 111 has a sliding surface 111d which linearly extends in place of the curved sliding surface 11d described above.

The pedal arm 120 includes a cylindrical part 21, an upper arm 22, a lower arm 23, an accelerator pedal 24, an abutting part 125 that abuts on the first slider 70, a spring receiving part 127 for receiving the other end part 52 of the return spring 50, etc.

The first slider 70 is made of a resin material, for example, a highly slidable material such as oil-impregnated polyacetal, and includes an abutting surface 71, a contact surface 72, an inclined surface 73, and a through hole 74.

The abutting surface 71 is formed such that the abutting part 125 of the pedal arm 120 can come into releasable contact therewith in an area around the through hole 74.

The contact surface 72 is formed as a flat surface that slides in contact with the sliding surface 111d of the housing 100.

The inclined surface 73 is formed to be in contact with the inclined surface 83 of the second slider 80.

The through hole 74 is formed to pass the return spring 50 and the spring receiving part 127 therethrough in a non-contact manner.

The second slider 80 is made of a resin material, for example, a highly slidable material such as oil-impregnated polyacetal, and includes a spring receiving part 81, a contact surface 82, an inclined surface 83, and a through hole 84.

The spring receiving part 81 is formed to receive the end part 42 of the biasing spring 40 in an area around the through hole 84.

The contact surface 82 is formed as a flat surface that slides in contact with the sliding surface 111d of the housing 100.

The inclined surface 83 is formed to be in contact with the inclined surface 73 of the first slider 70.

The through hole 84 is formed to pass the return spring 50 therethrough in a non-contact manner.

Also, in the present embodiment, since the biasing spring 40 and the return spring 50 are disposed in the same area (recess C) in the housing 100 as in the previous embodiment, the disposition space can be narrowed as compared with the configuration where they are disposed in separate areas.

Therefore, although two sliders are used for the hysteresis-causing mechanism, simplification of the structure, miniaturization of the housing 100, and miniaturization of the device can be achieved by integrating the biasing spring 40 and the return spring 50.

In particular, since the biasing spring 40 and the return spring 50 are coaxially disposed in a nested manner, the disposition area can be sufficiently secured by securing the area actually occupied by the biasing spring 40, which can further contribute to the miniaturization of the housing 100, the miniaturization of the device, or the like.

In the above embodiment, although the configuration in which the biasing spring 40 and the return spring 50 are coaxially disposed in a nested manner has been described, the present invention is not limited thereto as long as they are disposed in the same area of the housing. For example, configurations such as a configuration in which the slider and the spring receiving parts of the pedal arm are appropriately changed, and two coil springs are adopted as biasing springs and a return spring configured by one coil spring is disposed between the two biasing springs, a configuration in which one biasing spring and one return spring are disposed in parallel, or other configurations may be employed.

In the above embodiment, although the configuration in which the return spring 50 is passed through the through hole 30a has been described as the configuration in which the return spring 50 is disposed in the cut-off area of the slider, the present invention is not limited thereto. For example, the slider may be provided with a cutout as the cut-off area and the return spring 50 may be passed through the cutout.

In the above embodiment, although the configuration in which the contact part 25 of the pedal arm 20 is in contact with the first contact surface 31 of the slider 30 on the first straight line L1 passing through the axis S has been described, the present invention is not limited thereto, and a configuration may be adopted in which they are in contact with each other at a position deviated from the first straight line L1.

In the above embodiment, although the configuration in which the slider 30 is configured to receive the other end part 42 of the biasing spring 40 on the second straight line L2 having a predetermined acute angle θ with the first straight line L1 on the side closer to the contact part 25 than the axis S has been described, the present invention is not limited thereto. As long as the biasing spring 40 exerts biasing force for pressing the slider 30 against the sliding surface 11d of the housing 10, any other configurations may be employed.

In the above embodiment, although the configuration in which, as the slider, the slider 30 including the first outer contour part f1 having the outer contour on the surface perpendicular to the swing direction H formed in a substantially rectangular shape, and the second outer contour part f2 having the outer contour on the surface parallel to the swing direction H formed in a substantially fan shape is provided has been described, the present invention is not limited thereto.

As long as they slide on the inner wall of the housing and contact the contact part on one side and receive the biasing spring on the other side, any other sliders having other outer contours may be employed.

As described above, since the accelerator pedal device of the present invention can be reliably returned to the rest position when the accelerator pedal is returned while achieving miniaturization and the like of the entire device due to the integration of components and the desired hysteresis in the pedaling force can be obtained, the present invention is applicable not only to automobiles but also to motorcycles and other vehicles.

What is claimed is:

1. An accelerator pedal device comprising:
   a pedal arm having an accelerator pedal;
   a housing which swingably supports the pedal arm between a rest position and a maximum depressing position about a predetermined axis;
   a hysteresis-causing mechanism which includes a slider that slides on an inner wall of the housing and is pressed by depressing of the accelerator pedal, and a biasing spring that exerts a biasing force through the slider so as to push back the pedal arm, and which causes hysteresis in the depressing force; and
   a return spring which exerts a biasing force directly on the pedal arm in order to return the pedal arm to the rest position,
   wherein the biasing spring and the return spring are disposed in a same area inside the housing,
   wherein the biasing spring and the return spring are disposed such that each of center lines of the biasing spring and the return spring is straight while the pedal arm is at the rest position, and is convexly curved toward an axis side while the pedal arm is at the maximum depressing position,
   wherein the pedal arm includes a cylindrical part centered on the predetermined axis, and the cylindrical part has a concave relief part for disposing the biasing spring in a non-contact manner with the cylindrical part.

2. The accelerator pedal device according to claim 1, wherein the biasing spring and the return spring are compression type coil springs, and are coaxially disposed in a nested manner.

3. The accelerator pedal device according to claim 2,
   wherein the hysteresis-causing mechanism includes a contact part which is formed in the pedal arm in order to apply a pressing force while separably contacting the slider, and
   the biasing spring is disposed between the housing and the slider such that the biasing force for pressing the slider against the inner wall and the contact part increases in response to the depressing of the accelerator pedal.

4. The accelerator pedal device according to claim 3, wherein the slider has a spring receiving part for receiving the biasing spring, and a punched area through which the return spring passes, and
   the pedal arm has a spring receiving part for receiving the return spring in a vicinity of the contact part.

5. The accelerator pedal device according to claim 4, wherein the slider includes a cylindrical restricting part which is fitted to an inside of the biasing spring in an inner area of the spring receiving part.

6. The accelerator pedal device according to claim 4,
   wherein the pedal arm includes an upper arm extending upward from the cylindrical part and a lower arm extending downward from the cylindrical part,
   the upper arm has the contact part and a spring receiving part for receiving the return spring.

7. The accelerator pedal device according to claim 4, wherein the slider is formed to slide on the inner wall of the housing along a predetermined curvature around the axis.

8. The accelerator pedal device according to claim 4, wherein the contact part is configured to contact the slider on a first straight line passing through the axis.

9. The accelerator pedal device according to claim 4, wherein the slider includes a first outer contour part which has an outer contour on a surface perpendicular to a sliding direction of the slider configured in a substantially rectangular shape, and a second outer contour part which has an outer contour on a surface parallel to the sliding direction configured in a substantially sector shape.

10. The accelerator pedal device according to claim 3, wherein the slider is formed to slide on the inner wall of the housing along a predetermined curvature around the axis.

11. The accelerator pedal device according to claim 10, wherein the contact part is configured to contact the slider on a first straight line passing through the axis.

12. The accelerator pedal device according to claim 10, wherein the slider includes a first outer contour part which has an outer contour on a surface perpendicular to a sliding direction of the slider configured in a substantially rectangular shape, and a second outer contour part which has an outer contour on a surface parallel to the sliding direction configured in a substantially sector shape.

13. The accelerator pedal device according to claim 10, wherein the biasing spring and the return spring are disposed such that each of the respective center lines of the biasing spring and the return spring is convexly curved toward the axis side while the pedal arm is between the rest position and the maximum depressing position.

14. The accelerator pedal device according to claim 13, wherein the contact part is configured to contact the slider on a first straight line passing through the axis.

15. The accelerator pedal device according to claim 13, wherein the slider includes a first outer contour part which has an outer contour on a surface perpendicular to a sliding direction of the slider configured in a substantially rectangular shape, and a second outer contour part which has an outer contour on a surface parallel to the sliding direction configured in a substantially sector shape.

16. The accelerator pedal device according to claim 3, wherein the contact part is configured to contact the slider on a first straight line passing through the axis.

17. The accelerator pedal device according to claim 16,
   wherein the slider is configured to receive the biasing spring on a second straight line that forms a predetermined acute angle with the first straight line on a side closer to the contact part than the axis, and
   the pedal arm is configured to receive the return spring on a third straight line that forms the predetermined acute angle with the first straight line on a side closer to the contact part than the axis.

18. The accelerator pedal device according to claim 3, wherein the slider includes a first outer contour part which has an outer contour on a surface perpendicular to a sliding direction of the slider configured in a substantially rectangular shape, and a second outer contour part which has an outer contour on a surface parallel to the sliding direction configured in a substantially sector shape.

* * * * *